E. G. WATKINS.
Bed-Bug Trap.

No 168,306.        Patented Sept. 28, 1875.

WITNESSES:
C. Neveux
A. F. Terry

INVENTOR:
E. G. Watkins
BY
ATTORNEYS.

UNITED STATES PATENT OFFICE.

EDMUND G. WATKINS, OF GEORGETOWN, CALIFORNIA, ASSIGNOR TO JAMES B. WATKINS, OF SAME PLACE.

IMPROVEMENT IN BED-BUG TRAPS.

Specification forming part of Letters Patent No. 168,306, dated September 28, 1875; application filed May 22, 1875.

*To all whom it may concern:*

Be it known that I, EDMUND G. WATKINS, of Georgetown, El Dorado county, California, have invented a new and Improved Bed-Bug Trap, of which the following is a specification:

The invention will first be described in connection with drawing, and then pointed out in the claim.

Figure 1:
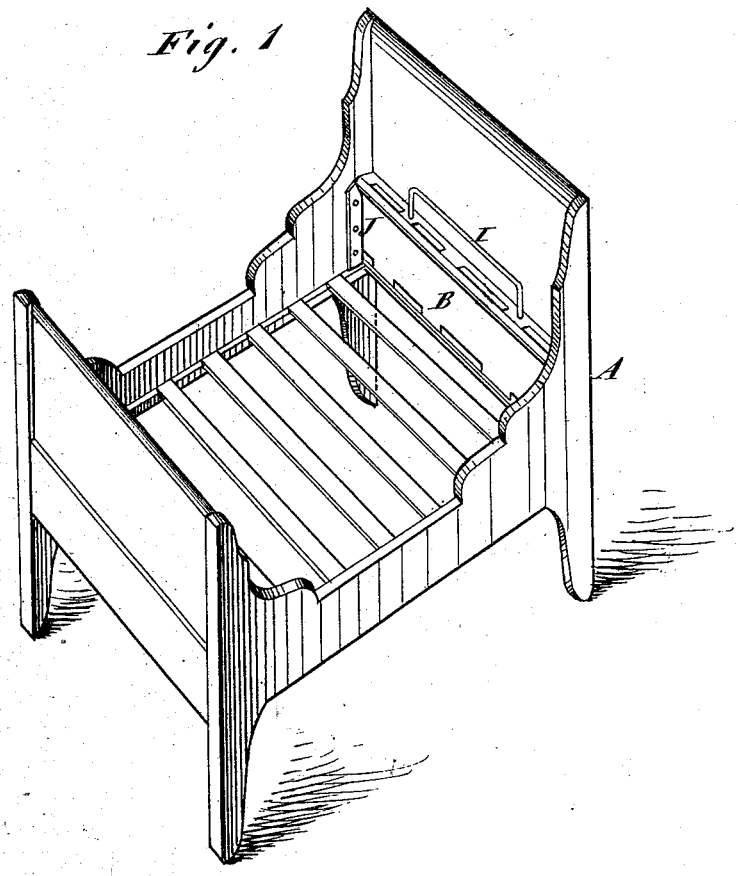
Figure 2:
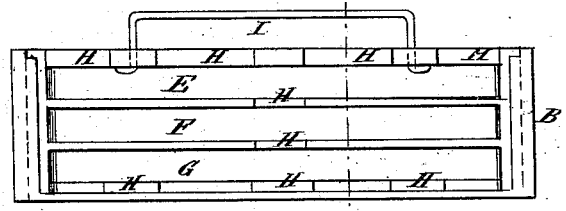
Figure 3:
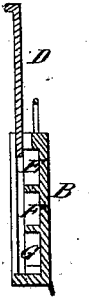

Figure 1 is a perspective view of a bedstead, showing the application of my invention. Fig. 2 is a side view of the trap detached, showing it with the slide removed to exhibit the cells; and Fig. 3 is a vertical cross-section of Fig. 2, taken on the line $x\ x$.

Similar letters of reference indicate corresponding parts.

A represents a bedstead. B is the trap, which is placed in any convenient part, (at the head, foot, or side.) In this example of my invention it is placed at the head, against the head-board. It consists of a celled case, having a slide or door, D, which is raised and lowered in grooves, as represented. E, F, and G represent the cells. H are apertures, through which the bugs pass to reach the cells, or any one of them. In the middle cell F a dark hiding-place is formed, where the bugs, if any, may always be found by raising the slide D; but by removing the trap from the bedstead the obnoxious vermin are readily destroyed, and they are sure to be found hid away, if any infest the bedstead, as it is decidedly the most convenient hiding-place to be found. I is the handle by which the trap is withdrawn. The trap is confined to the bedstead by cleats J, or by any other suitable means.

There may be more or less in number of the cells, and they may be arranged in any other manner.

Having thus described my invention, I claim as new and desire to secure by Letters Patent—

A bed-bug trap constructed with contiguous cells E F G and inlets H, and having a slide-cover, D, as shown and described.

EDMUND GARDNER WATKINS.

Witnesses:
   H. LOWENBERG,
   JAMES B. WATKINS.